(No Model.)

J. V. DINSMORE.
CAR WHEEL.

No. 252,745. Patented Jan. 24, 1882.

Witnesses.
S. N. Piper
E. B. Pratt

Inventor
John V. Dinsmore
by R. H. Eddy atty

UNITED STATES PATENT OFFICE.

JOHN V. DINSMORE, OF NORWOOD, MASSACHUSETTS.

CAR-WHEEL.

SPECIFICATION forming part of Letters Patent No. 252,745, dated January 24, 1882.

Application filed December 15, 1881. (No model.)

*To all whom it may concern:*

Be it known that I, JOHN V. DINSMORE, of Norwood, of the county of Norfolk and State of Massachusetts, have invented a new and useful Improvement in Railway-Car Wheels; and I do hereby declare the same to be described in the following specification and represented in the accompanying drawings, of which—

Figure 1:
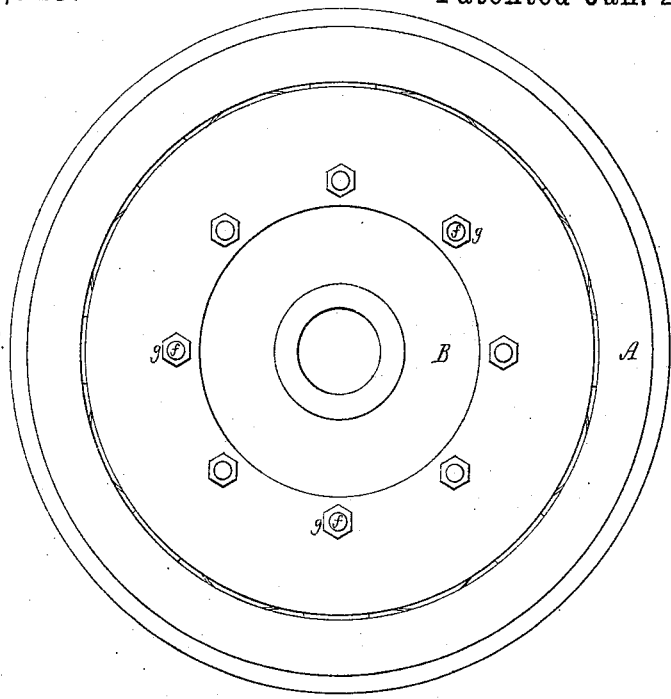
Figure 2:
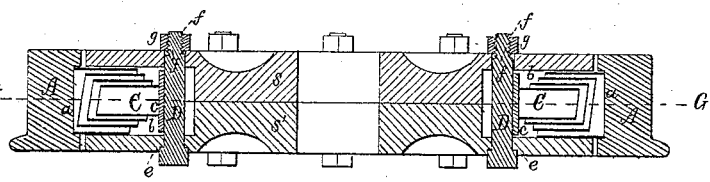

Figure 1 is a side elevation, Fig. 2 a transverse section, and Fig. 3 a longitudinal section, of a car wheel provided with my invention, the nature of which is defined in the claims hereinafter presented.

In such drawings, the tire A of the wheel is shown as rabbeted or provided with a groove, $a$, extending in and around it from its inner periphery. The body B of the wheel is furnished with a series of radial sockets, $b$, extending into it from its circumference, such sockets being at equal distances apart. In each of such sockets there is a spiral spring, C, which extends into the groove $a$, whose width corresponds to, or about to, the diameter of the spring. The spring at its inner end rests against a washer or disk, $c$, arranged in the socket, and against an eccentric or cam, $d$, projecting from a bolt, D, which goes transversely through the body B. The head of each of the bolts D is prismatic, and projects into a correspondingly-shaped recess, $e$, made in the body, such recess being to prevent the bolt from revolving or being revolved, which it will do when the bolt-head is within such recess. Each bolt has a screw, $f$, cut on it to receive a nut, $g$, the bolt being extended through the wheel sufficiently to take upon it such nut. On loosening the nut and driving back the bolt so as to remove its head from the recess such bolt may be turned so as to cause the spring to be contracted and to bear with greater pressure against the tire.

To facilitate the application of the springs to the body of the wheel or their removal therefrom, such wheel-body may be in two parts or sections, $s\ s'$, with their plane of junction (shown by the dotted line G G of Fig. 2) coincident with that of the axis of the several springs, in which case each part of the body would have within it semi-cylindric cavities for reception of the springs.

I would observe that the body of the wheel has a diameter a little less than the tire at its inner periphery, such being in order that the tire may move relatively to or diametrically of the body while the wheel may be in motion on a railway, the springs serving to support the tire and to prevent the concussions to which the tire may be subjected from doing injury to the axle or to the body of the wheel, or to the rails or frogs or switches of a railway.

Figure 3:
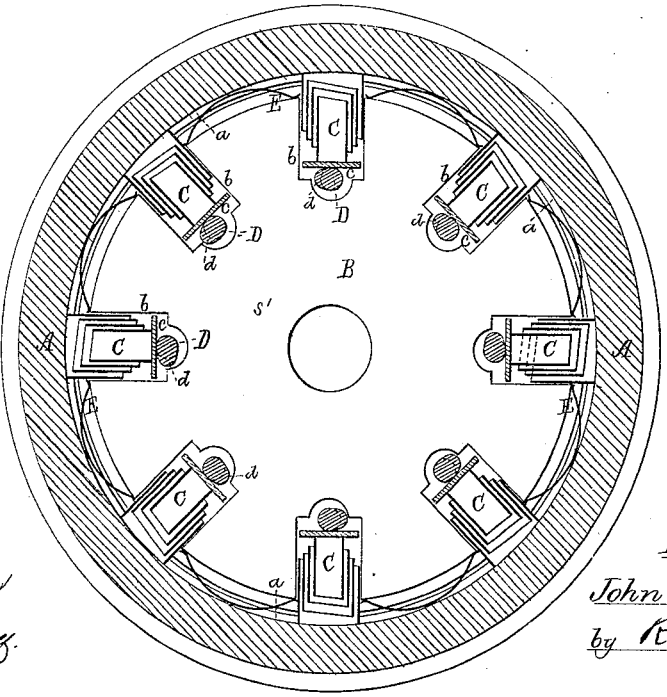

Between the spiral springs there may be in the tire-groove a series of auxiliary band-springs, E, arranged as shown in Fig. 3.

The head of each bolt I form as a regular equilateral prism, preferring it should have six (and generally more) sides.

What I claim as my invention is as follows, viz:

1. The combination of the tire, grooved at its inner periphery as described, with the wheel-body and the series of spiral springs, arranged in sockets therein and in the tire, as set forth.

2. The combination of the tire, grooved at its inner periphery as described, with the body, the series of spiral springs arranged therein and in the tire, as set forth, and with the series of cams arranged in such body and to operate with the springs, substantially as specified.

3. The combination of the tire, grooved at its inner periphery as described, with the body, the series of spiral springs arranged therein and in the tire, as set forth, and with the cams, screw-bolts, and nuts applied to such body and arranged with the springs, substantially in manner and to operate as shown and explained.

4. The wheel-body, made in sections $s\ s'$ and socketed as described, in combination with the grooved tire, and with the springs arranged in the sockets and tire, substantially in manner as set forth.

JOHN V. DINSMORE.

Witnesses:
R. H. EDDY,
E. B. PRATT.